May 17, 1927. 1,628,833
M. A. FRANK
BEARING PIN LUBRICATOR AND OBSTRUCTION EJECTOR
Filed March 7, 1925
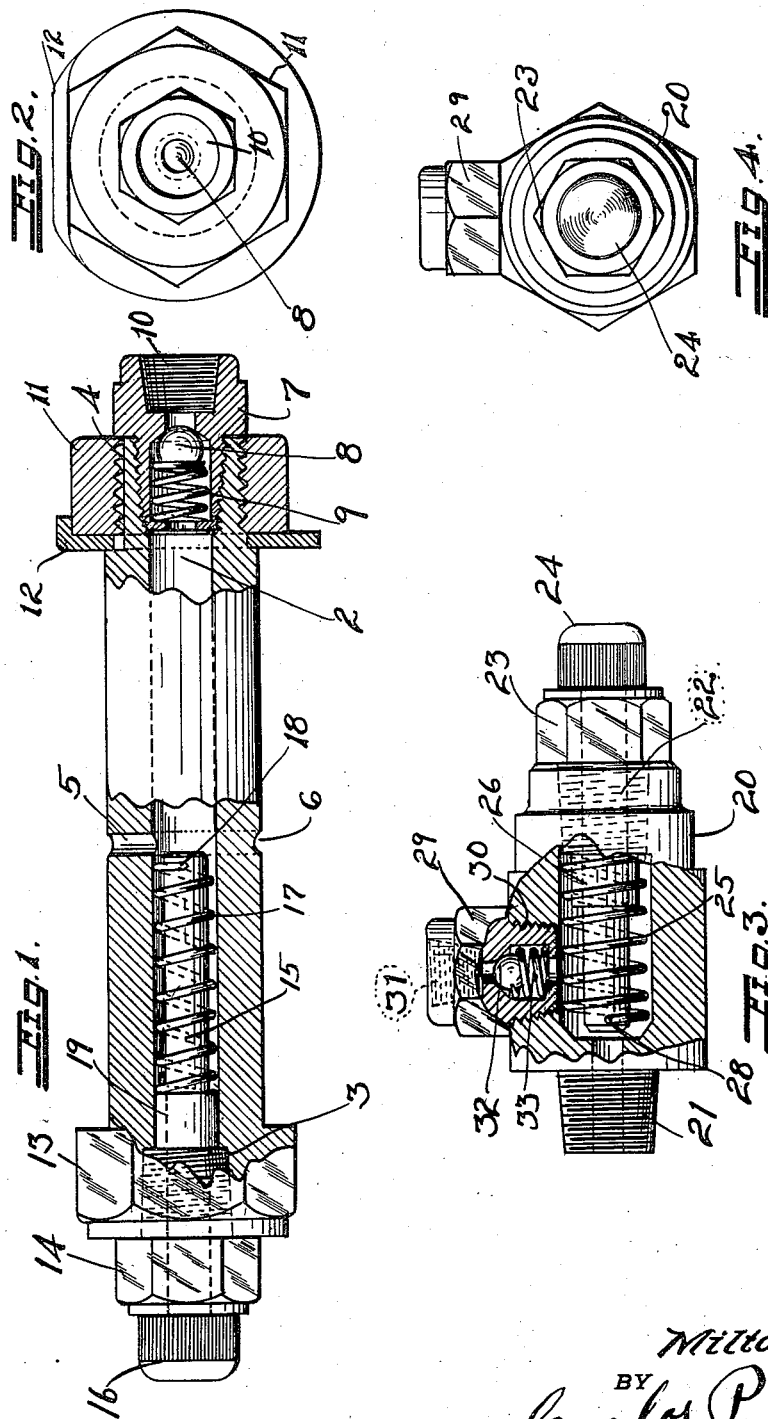
INVENTOR.
Milton A. Frank.
BY Carlos P. Griffin
ATTORNEY.

Patented May 17, 1927.

1,628,833

UNITED STATES PATENT OFFICE.

MILTON A. FRANK, OF SAN FRANCISCO, CALIFORNIA.

BEARING-PIN LUBRICATOR AND OBSTRUCTION EJECTOR.

Application filed March 7, 1925. Serial No. 13,747.

This invention relates to a lubricator and obstruction ejector for bearing pins, one object of which is to provide means for the attachment to the pin of any standard form of grease supply such as a grease cup, or high pressure grease gun fitting.

Another object of the invention is to supply the bearing pin with a valve fitting which will allow the pressure plunger used to raise the pressure within the pin chamber to expel any obstruction caused by hard dirt or grease in the pin bearing.

Another object of the invention is to provide the pressure plunger with a stiff retaining spring which will hold the plunger seated, unless the bearing is clogged up, thereby making unnecessary the use of great force whenever the bearings are in good operating condition, but which will allow the plunger to move outwardly in the pin chamber whenever the bearing is clogged, whereupon the user can hit the plunger with a hammer and thereby create a very high pressure within the pin and bearing chambers to expel any dirt or hard grease.

Another object of the invention is to produce a compact device which will be self contained for use on one end of an ordinary bearing pin, or which can be applied to opposite ends of a tubular pin where small size and neatness of the apparatus is a pre-requisite. The threaded fitting at the opposite ends of the bearing pin are interchangeable, so that either may be threaded in either end of the pin.

This invention is an improvement upon the invention disclosed in patent application Serial No. 750,998, filed by me, November 20th, 1924.

Another object of this invention is to provide a displacement plunger for the ejector and not a piston, because if a piston contacting with the cylinder walls is used repeated blows with a hammer upon the head of the plunger will cause the piston to be expanded under the high pressures attained and it will stick in the cylinder. With the use of the displacement plunger such as is herein described there is no such upsetting effect on the metal.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of the pin with certain parts shown in section.

Fig. 2 is an end view of Fig. 1, looking from the right.

Fig. 3 is a side elevation partly in section of the device as applied to one end of a bearing pin, and Fig. 4 is an end view looking from the right of Fig. 3.

The pin is shown at 1 and is provided with a bore 2, threaded at both ends as shown at 3 and 4. The center of the pin has a hole 5, and a peripheral grease distribution groove 6.

A fitting 7 carrying a ball check valve 8, seated by the spring 9, is screwed into the pin at one end and it has threads at 10 to receive an oil cup, or any one of several well known forms of pressure grease gun fittings. To lock the nut 11 in place is a well known form of keylock washer 12.

The opposite end of the pin has the head 13 formed thereon and into this head there is screwed the plunger retainer 14, through which the plunger 15 passes. The plunger 15 has the knurled striking head 16 and it is held normally in the position shown in Fig. 1 by the spring 17, one end of which passes into a hole in the plunger at 18, and the other end of which bears on the end of the sleeve 19, said sleeve forming an extension of the fitting 14, and by its own length increasing the bearing length in contact with the plunger 15 to thereby prevent loss of lubricant at that place.

In operation any suitable grease supply fitting is used on the fitting 7 to force grease in the pin. The spring 17 is quite stiff and if it does not allow the plunger 15 to be extended, the user knows that the bearing is clear and receiving grease properly. On the other hand, if the plunger is extended, the user knows that the bearing is not receiving the grease properly, whereupon a sharp blow with a hammer is struck on the head 16. This blow will place such a heavy pressure on the grease within the pin as to force it therefrom, even though the bearing may be full of hardened dirt, and at the same time the dirt will be ejected therefrom.

It may not be convenient to equip the machinery in which the pin is used with the pin shown in Figures 1 and 2, in which event the fitting shown in Figures 3 and 4 is used. This consists of a body 20 with a threaded nipple 21 at one end to be screwed into the threaded end of a well known form of bearing pin. At the other end it is internally threaded at 22 to receive the threaded shank of a plug 23, through which the plunger 25 extends, said plunger having a head 24 for striking purposes. A spiral spring 27 surrounds the plunger, and the sleeve 26, said spring being connected to the plunger at 28.

On the side there is a fitting 29, which is threaded at 30 to be secured to the body 20, and it is also internally threaded at 31 to receive the grease supply fitting of whatever kind it may be. A ball check valve 32 is retained in place by the spring 33.

The operation of this device is substantially the same as the other form, the only different feature being that the present form of the device presents both features thereof at one end of the bearing pin.

It will be seen, that, inasmuch as the pressures used within the pin are exceedingly high in some instances running up to from three to five thousand pounds per square inch, it is necessary to have the fittings 7, 14, 23 and 29 very tight in the member carrying them, and this is attained by providing them with tapering pipe threads. It will also be seen that both the fittings 7 and 29 are self-contained in themselves, the ends of the threaded nipple being inturned with a special tool to retain the small spring.

What I claim is as follows, but modifications may be made in carrying out the invention shown in the drawings and in the above particularly described form thereof, within the purview of the claim herein.

A bearing pin obstruction ejector comprising a member having a hole therethrough, a threaded nipple containing a ball check valve threaded into said member, a threaded plunger retainer, a plunger pin smaller than the bore of said member extending thereinto through the plunger retainer, said plunger having a striking head on its outer end, a spring adapted to hold said plunger at its innermost position under pressure normally sufficient to force grease through the bearing but capable of being pushed out if the grease passage is obstructed, said plunger being adapted to be driven to its innermost position by striking it a sharp blow to increase the pressure acting to clear the passage of the obstruction.

In testimony whereof I have hereunto set my hand this 27th day of February, A. D. 1925.

MILTON A. FRANK.